United States Patent [19]

Schmalstieg et al.

[11] Patent Number: 5,219,975
[45] Date of Patent: Jun. 15, 1993

[54] PROCESS FOR THE PREPARATION OF AMINES, THE AMINES THUS OBTAINED AND THE USE THEREOF AS HARDENERS FOR EPOXIDE RESINS

[75] Inventors: Lutz Schmalstieg, Cologne; Karl-Heinz Hentschel, Bergisch Gladbach; Josef Pedain, Cologne; Klaus Nachtkamp, Duesseldorf, all of Fed. Rep. of Germany

[73] Assignee: Bayer Aktiengesellschaft, Leverkusen, Fed. Rep. of Germany

[21] Appl. No.: 696,901

[22] Filed: May 7, 1991

[30] Foreign Application Priority Data

May 12, 1990 [DE] Fed. Rep. of Germany ....... 4015302

[51] Int. Cl.$^5$ ................ C08G 18/32; C08G 18/80; C08F 283/10; C07C 269/06
[52] U.S. Cl. .................... 528/45; 528/61; 528/64; 528/121; 528/122; 528/123; 528/124; 528/407; 528/418; 525/528; 560/25; 560/115; 560/158; 564/59
[58] Field of Search ............ 528/45, 16, 64, 121, 528/122, 123, 124, 407, 418; 525/528; 560/25, 115, 158; 564/59

[56] References Cited

U.S. PATENT DOCUMENTS

| | | | |
|---|---|---|---|
| 3,321,548 | 5/1967 | Sattler | 525/528 |
| 3,321,549 | 5/1967 | Barth | 525/528 |
| 3,926,922 | 12/1975 | Baron et al. | 528/64 |
| 3,931,116 | 1/1976 | Bernstein et al. | 528/64 |
| 3,993,708 | 11/1976 | Brinkmann et al. | 528/73 |
| 4,036,800 | 7/1977 | Sekmakas et al. | 525/528 |
| 4,085,161 | 4/1978 | Sekmakas et al. | 525/528 |
| 4,096,128 | 6/1978 | Frisch et al. | 528/64 |
| 4,435,558 | 3/1984 | Burba et al. | 528/45 |
| 4,495,229 | 1/1985 | Wolf et al. | 528/45 |
| 4,544,687 | 10/1985 | Schupp et al. | 525/528 |
| 4,574,147 | 3/1986 | Meckel | 528/64 |
| 4,608,416 | 8/1986 | Schupp et al. | 525/130 |
| 4,711,934 | 12/1987 | Paar et al. | 525/528 |
| 4,711,937 | 12/1987 | Paar | 525/528 |
| 4,761,465 | 8/1988 | Speranza et al. | 528/45 |
| 4,767,836 | 8/1988 | Cuscurida et al. | 528/45 |
| 5,010,160 | 4/1991 | Speranza et al. | 528/64 |
| 5,049,249 | 9/1991 | Chung et al. | 528/45 |
| 5,053,465 | 10/1991 | Waddill | 525/528 |
| 5,061,775 | 10/1991 | Schmalstieg et al. | 528/45 |
| 5,071,951 | 12/1991 | Ulrich et al. | 560/158 |
| 5,153,296 | 10/1992 | Gras et al. | 528/121 |

FOREIGN PATENT DOCUMENTS

| | | |
|---|---|---|
| 1219986 | 3/1987 | Canada . |
| 0082983 | 7/1983 | European Pat. Off. . |
| 0293110 | 11/1988 | European Pat. Off. . |
| 1252606 | 10/1967 | Fed. Rep. of Germany . |
| 1111170 | 2/1956 | France . |
| 1411485 | 8/1974 | United Kingdom . |

Primary Examiner—Morton Foelak
Assistant Examiner—Rabon Sergent
Attorney, Agent, or Firm—Joseph C. Gil; N. Denise Brown

[57] ABSTRACT

The present invention is directed to a process for the preparation of amines containing urethane and urea groups. The amines are produced by reacting A) isocyanate prepolymers containing urethane groups and in which the isocyanate groups are reversibly blocked with secondary monoamines with B) amines having molecular weights of from 60 to 500, which are at least difunctional and which have a total of at least two primary or secondary amino groups, with splitting off of the secondary monoamine. The invention is also directed to the amines so produced and to the use as a hardener for an epoxide resin.

9 Claims, No Drawings

PROCESS FOR THE PREPARATION OF AMINES, THE AMINES THUS OBTAINED AND THE USE THEREOF AS HARDENERS FOR EPOXIDE RESINS

BACKGROUND OF THE INVENTION

The present invention relates to a new process for the preparation of amines containing urethane and urea groups, to the amines obtained by this process and to their use as elasticizing hardeners for epoxide resins.

Synthetic resins based on epoxide resins are distinguished by numerous positive properties, e.g. good adherence to organic and inorganic substrates, good solvent resistance and high chemical resistance. Due to their high crosslinking density, however, epoxide resins which have been hardened with amines are brittle, with glass transition ranges above 20° C. This applies particularly to those epoxide resins which are based on diphenylol propane (bisphenol A) and epichlorohydrin. These synthetic resins therefore fail to meet the practical requirements in all fields of application for which impact resistance and shock resistance as well as high flexibility are required. This applies particularly to the building industry, where permanent bridging of shrinkage cracks, e.g. in concrete, is required.

Internal increase in elasticity can be achieved to a certain extent by a reduction in the crosslink density while an external increase in elasticity may be achieved by the addition of plasticizer.

External elasticizing agents such as tar, phthalic acid esters, high boiling alcohols or vinyl polymers are not reactive and do not become incorporated in the polymer network. They only cause expansion by filling up space.

An internal increase in elasticity by reduction of the crosslink density may be achieved by reducing the functionality of the hardener. The long chain, low functional amino amides based on dimerized fatty acids which have been widely and successfully used for a long time for this purpose are, however, not suitable in all fields.

Good and permanent increase in elasticity of the epoxide resins may be obtained by a combination with polyurethanes. Thus, for example, elasticized synthetic resins of epoxide resins, polyfunctional carbamic acid aryl esters and polyamines have been described in German Offenlegungsschrift 1,252,606. Synthetic resins prepared by these means have, however, two significant disadvantages. First, the use of a three component system is not always simple. Secondly, phenols or substituted phenols are released in the course of hardening of such synthetic resins since they are not chemically bound and in the long term they migrate from the synthetic resins, with the result that the properties of the product suffer.

German Auslegeschrift 2,418,041 describes a process for the preparation of elasticized molded parts and sheet products, in which certain epoxide compounds are reacted with amine compounds which have been obtained by the hydrolysis of certain prepolymeric ketimines or enamines. Chemically resistant, firmly adhering products with improved properties may be prepared by this process. The process described, however, is relatively complicated and therefore expensive. Further, the process is not universally applicable since, as shown by our own experiments, only isocyanate prepolymers based on aliphatic polyisocyanates can be reacted with hydroxy ketimines with complete preservation of the ketimine structure.

According to German Offenlegungsschrift 2,338,256, high molecular weight, amine-terminated polyether urethane ureas are prepared by the reaction of prepolymers containing free isocyanate groups with amines in highly dilute solutions and then hardened with epoxide resins. The use of the solvents required for this process, in particular the aromatic solvents, is technically and physiologically undesirable. On the other hand, the viscosity of the solvent free reaction products is too high for practical use.

For obtaining a controlled reaction of polyisocyanate prepolymers with excess quantities of diamines, it has therefore frequently been proposed to use the polyisocyanates in a blocked form as described, for example, in Canadian Patent 1,219,986, and European Patents 293,110 and 82,983. Common to all these publications is that phenols or substituted phenols are used as preferred blocking agents. After the reaction with the polyamines, these substances either cannot be removed from the reaction mixture, or can only be incompletely removed, due to their high boiling points. If phenols or substituted phenols are left in the amine mixture or the synthetic resin mass, the disadvantages already mentioned result. These references also mention that other blocking agents conventionally used in polyurethane chemistry may also be used, such as oximes, caprolactam, malonic acid esters or acetoacetic esters.

These blocking agents, however, all have a relatively high boiling point so that they also cannot be removed or cannot be completely removed from the reaction mixture by distillation. Since none of these blocking agents can be incorporated into the polymer structure in the course of epoxide hardening, their use in place of the preferred, optionally substituted phenols provides no advantages.

The use of organic polyisocyanates blocked with secondary monoamines in combination with isocyanate reactive compounds is known from German Offenlegungsschrift 3,221,558. According to this publication, low molecular weight polyisocyanates blocked with monoamines, in particular, are combined with relatively high molecular weight organic polyhydroxyl compounds. The publication contains no information relating to the reaction of amine-blocked isocyanate prepolymers with low molecular weight polyamines.

German Offenlegungsschrift 3,311,516 relates to combinations of polyisocyanates blocked with secondary monoamines with relatively high molecular weight polyaddition, polycondensation or polymerization products containing at least two OH and/or NH groups. The specifically described reactants for the blocked isocyanates are not low molecular weight organic polyamines, but are relatively high molecular weight polyhydroxyl compounds known per se in polyurethane chemistry or relatively high molecular weight hydroxyl-containing and amino-containing compounds obtained as reaction products between low molecular weight diamines and epoxide resins.

It was an object of the present invention to provide amines containing urethane and urea groups, in particular polyamines, which would contain exclusively epoxide-reactive components and be suitable as hardeners for epoxide resins.

DESCRIPTION OF THE INVENTION

The above noted problems have been solved by the present invention.

More particularly, the present invention relates to a process for the preparation of amines containing urethane and urea groups, comprising: reacting A) isocyanate prepolymers containing urethane groups and having their isocyanate groups reversibly blocked with secondary monoamines with B) amines having molecular weights of from 60 to 500 which are at least difunctional and which have a total of at least two primary or secondary amino groups with splitting off of the secondary monoamine, the reactants being used in proportions corresponding to more than 1.25 primary and/or secondary amino groups of component B) for each blocked isocyanate group of component A).

The invention further relates to amines containing urethane and urea groups obtainable by this process and to their use as elasticizing hardeners for epoxide resins.

In view of the fact that stoving temperatures of from 140° to 180° C. are typically employed, it was particularly unexpected that the isocyanate prepolymers blocked with secondary monoamines would be capable of reacting with low molecular weight polyamines at sufficiently low temperatures.

The urethane group-containing isocyanate prepolymers used as component A) according to the invention, in which the isocyanate groups are blocked with secondary monoamines, are prepared by the reaction of certain urethane group-containing isocyanate prepolymers of the type mentioned below with certain monoamines of the type also mentioned below at temperatures from 0° to 100° C., preferably from 20° to 50° C. The quantity of secondary monoamines to be used for the blocking reaction should be at least equivalent to the quantity of isocyanate groups to be blocked. A slight excess of secondary monoamines is in some cases advisable to ensure a complete reaction. The excess generally does not amount to more than 20 mol%, and preferably not more than 10 mol%, based on the isocyanate groups to be blocked. The blocking reaction may be carried out in the presence of inert solvents, for example, the lacquer solvents of the type exemplified below.

The urethane group-containing isocyanate prepolymers are advantageously obtained by the reaction of linear or branched polyalkylene ether polyols with di- or polyisocyanates. The polyalkylene ether polyols are prepared by the known processes of alkoxylating suitable starter compounds. Such polyethers typically have an average molecular weight, calculated from their hydroxyl functionality and hydroxyl group content, of from 500 to 10,000, preferably from 1000 to 6000. Suitable starter compounds include, for example, simple polyols, water, organic polyamines having at least two NH bonds and mixtures of such compounds. Suitable alkylene oxides for the alkoxylation reaction are in particular ethylene oxide and/or propylene oxide, which may be used for the alkoxylation reaction in any sequence or as a mixture. Monohydric polyether alcohols may in principle also be added so that polyether alcohols having an average hydroxyl functionality of from 1.5 to 4 are used in the preparation of the isocyanate prepolymers. The average hydroxyl functionality of the polyether alcohols used for the preparation of the isocyanate prepolymers is preferably from 2 to 4.

Polyisocyanates suitable for the preparation of the isocyanate prepolymers include any organic polyisocyanates, preferably diisocyanates in the molecular weight range of from 166 to 500, preferably from 166 to 300. Suitable examples include aliphatic and/or cycloaliphatic diisocyanates such as hexamethylene diisocyanate; 1,3- and 1,4-diisocyanato-cyclohexane and mixtures of these isomers; as well as 1-isocyanato-3,3,5-trimethyl-5-isocyanatomethyl-cyclohexane (isophorone diisocyanate) and 4,4'-diisocyanato-dicyclohexyldimethane.

Aromatic polyisocyanates are, however, more preferred due to their low reaction temperatures. Examples include 2,4-diisocyanato-toluene and commercial mixtures thereof preferably containing 2,6-diisocyantotoluene in quantities of up to 35% by weight, based on the mixture; 4,4'-diisocyanatodiphenylmethane and commercial mixtures thereof with 2,4'- and optionally 2,2'-diisocyanatodiphenylmethane and/or higher homologues thereof.

The polyether alcohols are converted into isocyanate group-containing polymers by a reaction with the di- or polyisocyanates in known manner. If a certain amount of additional chain lengthening via urethane groups is acceptable or even desirable, the polyalkylene ether polyols are reacted with the di- or polyisocyanates in an NCO/OH ratio of from 1.5 to 2.5, preferably from 1.8 to 2.2. If a chain lengthening reaction is not desired, a substantially greater excess of di- or polyisocyanate is employed, preferably corresponding to an NCO/OH ratio of from 3 to 5, with the excess di- or polyisocyanate being removed after the reaction, for example by thin layer distillation if the di- or polyisocyanates are capable of being distilled or by solvent extraction if they are not distillable.

The secondary monoamines used for the preparation of the blocked isocyanate prepolymers used as component A) according to the invention may be any organic compounds containing a secondary amino group but otherwise preferably inert towards isocyanate groups. For example, the monoamines may be compounds corresponding to the following formula

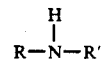

where R and R' may be identical or different and represent aliphatic hydrocarbon groups having 1 to 18, preferably 1 to 6 carbon atoms or cycloaliphatic hydrocarbon groups having 6 to 13, preferably 6 to 9 carbon atoms, or together with the nitrogen atom form a heterocyclic 5 membered or 6 membered ring optionally containing further heteroatoms (nitrogen or oxygen).

The following are examples of suitable or preferred secondary monoamines: dimethylamine, diethylamine, diisopropylamine, di-n-butylamine, diisobutylamine, N-methyl-n-hexylamine, N-methyl-stearylamine, N-ethyl-cyclohexylamine, dicyclohexylamine, piperidine, hexamethylene imine, pyrrolidine and morpholine. Suitable but less preferred are those secondary monoamines which in addition to their secondary amino groups contain another isocyanate reactive group but one which is less reactive than secondary amino groups. Compounds of this type include, for example, amino alcohols such as diethanolamine or diisopropanolamine.

Secondary monoamines which have a low boiling point so that they can easily be removed from the reaction mixture by distillation are particularly suitable. Typical of such amines are, e.g. dimethylamine, diethylamine, diisopropylamine, di-n-butylamine, pyrrolidine, piperidine, morpholine or N-methylcyclohexylamine.

Diisopropylamine is particularly preferred since it enables particularly low reaction temperatures to be employed and can easily be removed from the reaction mixture by virtue of its low boiling point (84° C.).

The usual solvents such as butyl acetate, propylene glycol monomethyl ether acetate, toluene, xylene or mixtures of such solvents may be used for the preparation of the blocked isocyanate prepolymers to be used as component A) according to the invention.

Component B) consists of organic polyamines having molecular weights of from 60 to 500, preferably from 60 to 300, and having a total of at least two primary and/or secondary amino groups per molecule, preferably two primary amino groups per molecule. The following, for example, are suitable: ethylene diamine, 1,2-diaminopropane, 1,3-diaminopropane, 1,4-diaminobutane, 1,6-diaminohexane, 2,2,4- and/or 2,4,4-trimethylhexamethylene diamine, and polyamines which contain secondary amino groups in addition to the two or more primary amino groups, such as, for example, diethylene triamine or triethylene tetramine.

Particularly preferred, however, are polyamines and in particular diamines in the above mentioned molecular weight range which have one or more cycloaliphatic rings. These include, for example, 1,4-diaminocyclohexane, 4,4'-diaminodicyclohexyl methane, 1,3-diaminocyclopentane, 4,4'-diaminodicyclohexyl-propane-(2,2), 3,3'-diaminodicyclohexylpropane-(2,2), 4-isopropyl-1,2-diaminocyclohexane, 3,3'-dimethyl-4,4'-diamino-dicyclohexylmethane, 3-aminomethyl-3,3,5-trimethylcyclohexylamine (isophorone diamine) and commercial bis-aminomethyl-tricyclodecane which is marketed by Hoechst AG under the name of "TCD-Diamin".

In the process according to the invention, the polyamines B) are used in quantities providing more than 1.25 primary and/or secondary amino groups of component B) for each blocked isocyanate group of component A). The molar ratio of primary and/or secondary amino groups of component B) to blocked isocyanate groups of component A) is preferably from 1.5:1 to 20:1, and in particular from 2:1 to 10:1.

The reaction according to the invention takes place within the temperature range of from 20° to 180° C., preferably from 60° to 140° C.

The excess of amine component B) could in principle be removed after the reaction, e.g. by thin layer distillation, but in a preferred embodiment of the present invention, the amines are left in the reaction mixture to function as viscosity and reaction regulators. The ratio of reaction product to free amine may vary within relatively wide limits so that the hardener can be adapted to the given requirements of viscosity and reactivity.

In a particularly preferred embodiment of the present invention, the blocking agent is removed from the reaction mixture by distillation during and/or after the reaction of A) with B). This particularly preferred procedure can always be carried out trouble free if the boiling point of the monoamine used for blocking is substantially lower than that of the amine component B).

The blocking agent may, however, be completely or partly left in the reaction mixture since in contrast to the blocking agents known in the art the secondary monoamines become incorporated in the polymer structure in the course of epoxide hardening. It may in some cases even be desirable to leave the blocking agent in the amine mixture since the resulting lowering in functionality results in an additional increase in elasticity.

The products of the process according to the invention are thus amines and preferably polyamines, containing urethane and urea groups, obtained from the reaction of A) with B) and distillative removal of the blocking agent and any excess of component B), or mixtures of i) such amines, preferably polyamines with ii) blocking agents for component A) which have not been completely removed by distillation, and/or with iii) excess polyamine B). These mixtures generally contain at least 2.5% by weight, preferably not less than 10% by weight, of component i), up to 35% by weight of component ii) and/or up to 75% by weight of component iii), based on the total weight of components i), ii) and iii), with the above mentioned percentages adding up to 100. Among the urethane group-containing and urea group-containing polyamines, (component i)), those which are particularly preferred for the invention contain, on average, from 1.5 to 4 primary and/or secondary amino groups per molecule and have an average molecular weight, calculated from the stoichiometry of the starting materials, of from 1000 to 7,500. The proportion of primary amino groups in the products of the process according to the invention is preferably from 0.5 to 20% by weight. The viscosity of the products at 22° C. is preferably from 5000 to 300,000 mPas. At viscosities above 200,000 mPas/22° C., subsequent use of the products preferably takes place in combination with the viscosity regulators of the type mentioned above.

Mixtures of the products according to the invention and epoxide resins are heat curable and cold curable. Suitable epoxide resins contain on average more than one epoxide group per molecule and may be glycidyl ethers of polyhydric alcohols such as butane diol, hexane diol, glycerol or hydrogenated diphenyl propane or of polyvalent phenols such as resorcinol, diphenylol propane or phenolaldehyde condensates. Glycidyl ethers of polybasic carboxylic acids such as hexahydrophthalic acid or dimerized fatty acid may also be used.

It is particularly preferred to use liquid epoxide resins having molecular weights from 340 to 450 based on epichlorohydrin and diphenylol propane. The viscosity of the mixture may be lowered, if desired, by means of monofunctional epoxide compounds, whereby the processing properties are improved. Examples of such epoxide compounds include aliphatic and aromatic glycidyl ethers such as butylglycidyl ether and phenylglycidyl ether or glycidyl esters such as glycidyl acrylate or epoxides such as styrene oxide and 1,2-epoxydodecane.

The products of the process according to the invention may be mixed with other amine hardeners of the type known from epoxide resin chemistry before their use according to the invention. Examples of these hardeners include the usual amine hardeners used in this field, e.g. polyamino amides optionally containing imidazoline groups.

For the preparation of mixtures ready for use, the usual auxiliary agents and additives such as fillers, pigments, reaction accelerators and viscosity regulators may be incorporated in the combinations of epoxide resins and hardeners according to the invention. Examples of such additives include reaction accelerators such as salicylic acid, bis-(dimethyl-aminomethyl)-phenol and tris-(dimethylaminomethyl)-phenol; fillers such as sand, powdered rock, silica, powdered asbestos, kaolin, talc, metal powder, tar, tar pitch, asphalt, cork scrap, and polyamides; plasticizers such as phthalic acid esters and other viscosity regulators such as, for example, benzyl alcohol. Epoxide resin hardener combinations in which the products of the process of the invention are used as all or part of the hardeners are suitable for the production of coatings, adhesives, sealing compounds and molded parts in all fields of application where good adherence, chemical resistance and high impact strength and shock resistance are required in combination with improved flexibility and elasticity.

The percentages given in the following Examples are all percentages by weight. The quantity of primary or secondary amino groups in the products of the process was determined titrimetrically.

EXAMPLES

A) Preparation of an isocyanate prepolymer blocked with secondary monoamine (prepolymer A))

2000 grams of a polyether diol with OH number 28 prepared by the propoxylation of propylene glycol followed by ethoxylation of the propoxylation product (PO:EO ratio by weight=86:14) are prepolymerized with 174 grams of 2,4-diisocyanatotoluene at 70° C. until a constant isocyanate content of 1.9% is obtained. After the reaction mixture has cooled to room temperature, 106 grams of diisopropylamine are rapidly added and stirring is continued until the mixture contains no more free isocyanate. The blocked isocyanate group content (calculated as NCO) is 1.84%.

Example 1

444 grams of isophorone diamine are added to 2,280 grams of the blocked prepolymer A) and the mixture is heated to 70° C. with stirring. The diisopropylamine released is distilled with reduction of the pressure to 20 mbar. After 5 hours stirring under vacuum, the reaction is completed, as is recognized by the fact that no further distillate can be obtained. The content of primary amino groups is 1.56%. The viscosity of the polyamine is 150,000 mPas/22° C.

Hardening of an epoxide resin 19 grams of a commercial epoxide resin of diphenylol propane and epichlorohydrin having an average epoxyequivalent weight of 190 are mixed with 44 grams of the polyamine described above. The product is hardened by heating to 100° C. for one hour. A tough elastic synthetic resin with shore hardness D 40 is obtained.

Example 2

388 grams of commercial bis-aminomethyl-tricyclodecane ("TCD-Diamine" of Hoechst AG) are added to 2,280 grams of the blocked prepolymer A . After heating to 70° C., the diisopropylamine liberated is distilled off at reduced pressure. The resulting polyamine contains 1.52% of primary amino groups. The viscosity of the mixture is 200,000 Pas/22° C.

Hardening of an epoxide resin 19 grams of a commercial epoxide resin of diphenylolpropane and epichlorohydrin having an average epoxyequivalent weight of 190 are mixed with 42 grams of the polyamine described above. The mixture hardens at room temperature and has a pot life of about two hours. The hardened synthetic resin has a hardness of shore D 38.

Example 3

129 grams of N-(2-aminoethyl)-piperazine are added to 2,280 grams of the blocked prepolymer A). After the mixture has been heated to 70° C., the diisopropylamine liberated is distilled off at reduced pressure. When the reaction is completed, the reaction product is diluted to a solids content of 70% with benzyl alcohol. The mixture has a viscosity of 60,000 mPas/22° C. The primary amino group content is 0.22% and the secondary amino group content is 0.19%.

Example 4

257.5 grams of diethylene triamine are added to 2,280 grams of the blocked prepolymer A). After the mixture has been heated to 70° C., diisopropylamine liberated is distilled off at reduced pressure. The resulting polyamine has a viscosity of 82,000 mPas/23° C. The primary amino group content is 2.49%, and the secondary amino group content is 1.04%.

Example 5

158 grams of an isomeric mixture of 2,2,4- and 2,4,4-trimethyldiamine are added to 2,280 grams of the blocked prepolymer A). After the mixture has been heated to 70° C., diisopropylamine liberated is distilled off at reduced pressure. The resulting polyamine has a viscosity of 150,000 mPas/22° C. The primary amino group content is 0.6%.

Hardening of an epoxide resin 19 grams of a commercial epoxide resin of diphenylolpropane and epichlorohydrin having an average epoxyequivalent weight of 190 are mixed with 115grams of the polyamine described above. The product is hardened by heating to 100° C. for one hour. An elastic synthetic resin having a hardness of shore A 42 is obtained. cl B) Preparation of an isocyanate prepolymer blocked with secondary monoamine (prepolymer B))

3000 grams of a polyether polyol with OH number 48 prepared by the propoxylation of trimethylol propane and 1400 g of 2,4diisocyanato toluene are heated to 70° C. for 5 hours with stirring. The excess of diisocyanate is then removed by thin layer distillation under vacuum. A prepolymer containing isocyanate end groups and having an isocyanate content of 3.2% is obtained. 103 grams of di-n-butylamine are rapidly added dropwise to 1000 grams of the prepolymer at room temperature. The temperature of the mixture rises to about 40 C. The mixture is stirred without heating until the product has no detectable isocyanate content. The product contains 2.9% of blocked NCO groups.

Example 6

1448 grams of the blocked prepolymer B) are mixed with 510 grams of isophorone diamine. The mixture is heated 100° C. and dibutylamine liberated is distilled off at reduced pressure. The resulting polyamine has a primary amino group content of 4.0%. The viscosity is 60,000 mPas/22° C.

C) Preparation of an isocyanate prepolymer blocked with secondary monoamine (prepolymer C))

68 grams of piperidine are rapidly added dropwise at room temperature to 1000 grams of the thin layer distilled NCO prepolymer described under B). The temperature of the mixture rises to about 40° C. The mixture is stirred without being heated until the product has no detectable isocyanate content. The product contains 3.0% of blocked NCO groups. Example 7 1400 grams of the blocked prepolymer C) are mixed with 510 grams of isophorone diamine. The mixture is heated to 100° C. and piperidine liberated is distilled off at reduced pressure. The resulting polyamine has a primary amino group content of 4.0%. The viscosity is 60,000 mPas/22° C.

D) Preparation of an isocyanate prepolymer blocked with secondary monoamine (prepolymer D))

1000 grams of a polyether polyol of molecular weight 2000 prepared by the propoxylation of propylene glycol and 211 grams of isophorone diisocyanate are reacted together at 100° C. to form an isocyanate prepolymer having an isocyanate content of 3.1%. After the prepolymer has been cooled to room temperature, 91 grams of diisopropylamine are rapidly added dropwise and the mixture is stirred until it contains no more free isocyanate. The product contains 2.9% of blocked isocyanate groups.

Example 8

1450 grams of the blocked prepolymer D) are mixed with 436 grams of commercial bis-aminomethyl-tricyclodecane ("TCD-Diamine" of Hoechst AG). The mixture is heated to 70° C. and the diisopropylamine liberated is distilled at reduced pressure. After the reaction has been completed, the product is diluted with benzyl alcohol to a solids content of 90%. The viscosity of the mixture is 50,000 mPas/22° C. The primary amino group content is 2.65%.

E) Preparation of an isocyanate prepolymer blocked with secondary monoamine (prepolymer E))

2000 grams of a polyether diol with OH number 28 prepared by the propoxylation of propylene glycol followed by ethoxylation of the propoxylation product (PO:EO ratio by weight=86:14) are prepolymerized with 225 grams of 4,4'-diisocyanatodiphenylmethane at 70° C. until a constant isocyanate content of 1.5% is obtained. After cooling to room temperature, 81 grams of diisopropylamine are rapidly added dropwise at room temperature. Stirring is continued until the mixture contains no free isocyanate. The product contains 1.45% of blocked isocyanate groups.

Example 9

2,895 grams of the blocked prepolymer E) are mixed with 436 grams of commercial bis-aminomethyl-tricyclodecane ("TCD-Diamine" of Hoechst AG). The mixture is heated to 70° C. and the diisopropylamine liberated is distilled off at reduced pressure. After completion of the reaction, the product is diluted to a solids content of 90% with benzyl alcohol. The viscosity of the mixture is 60,000 mPas/22° C. The primary amino group content is 1.51%.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for the preparation of amines containing urethane and urea groups, comprising reacting
    A) isocyanate prepolymers containing urethane groups and in which the isocyanate groups are reversibly blocked with secondary monoamines with
    B) amines having molecular weights of from 60 to 300, which are at least difunctional and which have a total of at least two primary or secondary amino groups, with splitting off of the secondary monoamine, the reactants being used in such quantitative proportions that the reaction mixture contains more than 1.25 primary and/or secondary amino groups of component B) for each blocked isocyanate group of component A).

2. The process of claim 1, wherein the blocked isocyanate prepolymers A) are prepared by the reaction of polyether polyols having molecular weights of from 500 to 10,000 with an excess of an organic polyisocyanate, followed by reaction of the remaining free isocyanate groups with a secondary monoamine.

3. The process of claim 2, wherein the secondary monoamines used are of the type which can be removed from the reaction mixture by distillation after the reaction of component A) with component B).

4. The process of claim 3, wherein the secondary monoamine used is diisopropylamine.

5. The process of claim 1, wherein components A) and B) are used in quantities corresponding to a molar ratio of primary and/or secondary amino groups of component B) to blocked isocyanate groups of component A) of from 2:1 to 10:1.

6. The process of claim 1, wherein a diprimary diamine containing at least one cycloaliphatic ring is used as component B).

7. The process of claim 1, wherein the reaction is carried out at 60° to 140° C. and the blocking agent liberated is removed from the reaction mixture by distillation.

8. An amine containing urethane and urea groups produced by the process of claim 1.

9. In a method of hardening an epoxy resin by use of an amine, the improvement wherein the amine contains urethane and urea groups and is produced according to the process of claim 1.

* * * * *